United States Patent
Ionkin

(10) Patent No.: US 7,671,163 B2
(45) Date of Patent: Mar. 2, 2010

(54) POLYMERIZATION PROCESS USING BIVALENT MONOMERIC PHENOXY TIN CATALYSTS

(75) Inventor: Alex Sergey Ionkin, Kennett Square, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 986 days.

(21) Appl. No.: 11/407,007

(22) Filed: Apr. 18, 2006

(65) Prior Publication Data

US 2007/0243390 A1    Oct. 18, 2007

(51) Int. Cl.
*C07F 7/00*    (2006.01)

(52) U.S. Cl. .......................................... 528/48; 556/81

(58) Field of Classification Search ................... 502/103
See application file for complete search history.

(56) References Cited

U.S. PATENT DOCUMENTS 4,970,288 A * 11/1990 Larkin et al. ................ 528/272
5,008,297 A * 4/1991 Maruyama et al. .......... 521/136
6,030,917 A * 2/2000 Weinberg et al. ............. 506/21
6,187,711 B1 2/2001 Bernard et al.

OTHER PUBLICATIONS

Ivan J. Boyer, Toxicity of Dibutylyin, Tributyltin and Other Organotin Compounds to Humans and to Experimental Animals, Toxicology, 1989, vol. 55:253-298.
Thomas F. Lytle et. al., Life-Cycle Toxicity of Dibutyltin to the Sheepshead Minnow (Cyprinodon Variegatus) and Implications of the Ubiquitous Impurity in Test Material, Applied Organometallic Chemistry, 2003, vol. 17:653-661.
Bernard Jousseaume et. al., Air Activated Organotin Catalysts for Silicone Curing and Polyurethane Preparation, Organometallics, 1994, vol. 13:1034-1038.
B. Cetinkaya et. al., Bivalent Germanium, Tin, and Lead 2,6-Di-Tert-Butylphenoxides and the Crystal and Molecular Structures of M(OC6H2ME-4-BU2-6), Journal of the American Chemical Society, 1980, vol. 102:2088-2089.

* cited by examiner

*Primary Examiner*—Jerry Lorengo
*Assistant Examiner*—Yun Qian
(74) *Attorney, Agent, or Firm*—Gail D. Tanzer

(57) ABSTRACT

The present invention relates to monomeric bivalent phenoxy tin compounds, processes for making the phenoxy tin compounds, and processes for making polyurethanes using the tin compounds as polymerization catalysts.

6 Claims, 1 Drawing Sheet

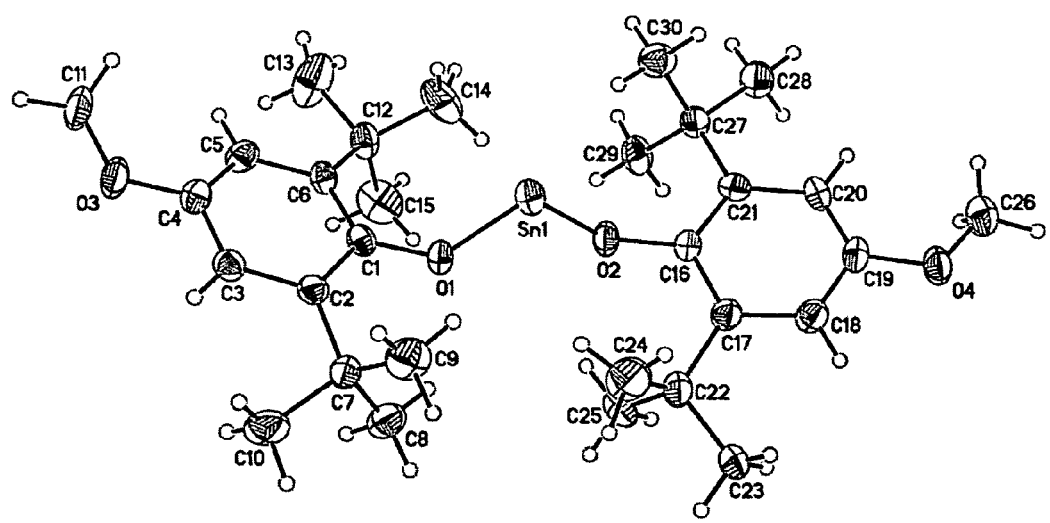
Figure 1. Ortep drawing of 2,6-di-*tert*-butyl-4-methoxy-phenoxide of Sn(II).

POLYMERIZATION PROCESS USING BIVALENT MONOMERIC PHENOXY TIN CATALYSTS

FIELD OF THE INVENTION

The present invention relates to bivalent tin compounds. The compounds are stabilized by phenoxy groups with bulky ortho-substituents and are suitable for use as catalysts for polymerization, primarily for polyurethane polymerization.

BACKGROUND

Coating manufacturers have achieved significant progress in developing novel components for polyurethanes to improve coating properties, although less effort has been put into the search for novel catalyst systems. The usual catalysts for this process are dibutyltindilaurate and tertiary amines. Dialkyl and trialkyltin derivatives, classes of the compounds to which dibutyltindilaurate belongs to, have been discussed as having some issues regarding human toxicity. See, for example, Boyer, I. J., *Toxicology*, 1989, 55, 253 and Lytle, T. F.; Manning, C. S.; Walker, W. W.; Lytle, J. S.; Page, D. S., *Appl. Organomet. Chem.*, 2003, 17, 653. Divalent tin compounds as disclosed herein, which do not have alkyl-tin bonds, have been tested as catalysts for polyurethane formation.

Organometallics of the group 14 elements, particularly dibutyltin derivatives, are known to catalyze transesterification, transcarbamoylation and urethane formation. While there has been progress in developing novel components for polyurethanes to improve coating properties, a need remains for novel catalyst systems. Known catalysts for forming polyurethanes include dibutyltindilaurate and tertiary amines. Dialkyl and trialkyltin derivatives, classes of the compounds to which dibutyltindilaurate belongs, have some toxicity to humans, so less toxic catalysts are desired.

Jousseaume, B. et al., ("Air Activated Organotin Catalysts for Silicone Curing and Polyurethane Preparation" (1994) Organometallics 13:1034), and Bernard, J. M. et al. (U.S. Pat. No. 6,187,711) describe the use of distannanes as latent catalysts, e.g. $Bu_2(AcO)SnSn(OAc)Bu_2$.

B. Cetinkaya, et al., J. Am. Chem. Soc. (1980), 102(6), 2088-9, disclose bivalent germanium, tin, and lead 2,6-di-tert-butylphenoxides and the crystal and molecular structures of $M(OC_6H_2Me-4-But2-2,6)_2$, where M is Ge or Sn.

Co-pending and co-owned U.S. patent applications (Ser. No. 11/407,003, issued as U.S. Pat. No. 7,625,992 Ser. No. 11/406,994, issued as U.S. Pat. No. 7,626,049, Ser. No. 11/407,009, issued as U.S. Pat. No. 7,371,879), all incorporated by reference in their entirety, disclose divalent and quadrivalent tin and germanium compounds and their use as catalysts. (Ser. No. 11/407,003, issued as U.S. Pat. No. 7,625,992) describe quadrivalent derivatives of tin and germanium and their use as catalysts. (Ser. No. 11/406,994, issued as U.S. Pat. No. 7,626,049) describes divalent tin and germanium compounds stabilized by bulky chelating P^O ligands.

SUMMARY OF THE INVENTION

The present invention relates to, in some embodiments, a process comprising providing a catalyst of the formula:

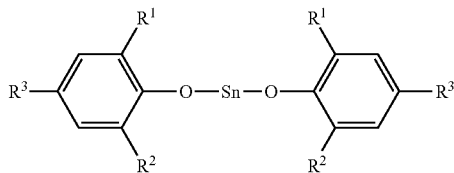

wherein
each $R^1$ and $R^2$ are each independently a sterically hindering group;
each $R^3$ is independently a compound that enables solubility of the catalyst; and
b) combining said catalyst with one or more isocyanate-reactive groups with one or more compounds comprising an isocyanate group; to form a polyurethane having a gel time.

BRIEF DESCRIPTION OF THE FIGURES/DRAWINGS

FIG. 1 is an ORTEP drawing of 2,6-di-tert-butyl-4-methoxy-phenoxide of Sn(II).

DETAILED DESCRIPTION

In one embodiment, the present invention provides bivalent tin compounds and processes for making the compounds. In some embodiments, the invention provides processes for urethane polymerization wherein the bivalent tin compounds are used as catalysts.

Because phenoxytin(II) compounds do not contain direct tin-carbon bonds (e.g., tin-butyl groups in the majority of cases), they are expected to have lower human toxicity. It is believed that the ortho-tert-butyl substituted phenoxy groups are less toxic to humans. It has been discovered that phenoxytin(II) compounds are useful as catalysts for the polymerization of alcohols and isocyanates to form polyurethane polymers.

The catalysts used in the processes herein comprise sterically hindered groups. These groups are generally "bulky", as the term is used and well-known to those skilled in the art, and the term "sterically hindered", as used herein, refers to compounds having a spatial arrangement of their atoms such that a given reaction with another molecule is prevented or retarded. For example, a sterically hindered group can prevent the dimerization or oligomerization of two-coordinated tin atom, and thus will allow tin atom to be divalent and two-coordinated.

Non-limiting examples of sterically hindered groups are tert-butyl, triethylmethyl, triphenylmethyl (Trityl), 1-methylcyclohexyl, 1-methylcyclopentyl, neopentyl, trimethylsilyl, triphenylsilyl, tert-butyldimethylsilyl, tris(trimethylsilyl)silyl, trifluoromethyl, adamantyl, methyladamantyl, di-tert-butyl-phosphino, di-tert-butyl-thiophosphino, di-tert-butyl-phosphoryl, di-tert-butyl-iminophosphino, di-mesityl-phosphino, di-mesityl-thiophosphino, di-mesityl-phosphoryl, di-mesityl-iminophosphino, tert-butyl-amino, tert-butyl-thio, tert-butyl-seleno, tert-butoxy, di-tert-butyl-boronyl; mesityl, 2,4,6-tri-iso-propylphenyl, 2,4,6-tri-ethylphenyl, 2,4,6-tri-tert-butylphenyl, 2,4,6-tri-phenylphenyl, pyrenyl, anthracenyl, acridinyl, and xanthenyl.

In some embodiments of the present invention, a process comprises providing a catalyst of the formula:

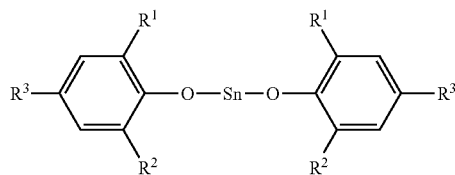

wherein
each $R^1$ and $R^2$ are each independently a sterically hindering group;
each $R^3$ is independently a compound that enables solubility of the catalyst; and
b) combining said catalyst with one or more isocyanate-reactive groups with one or more compounds comprising an isocyanate group; to form a polyurethane having a gel time.

More specifically, in some embodiments of the invention, $R^1$ and $R^2$ sterically hindering groups are each independently selected from the group consisting of trialkyl, heteroaryl, phenyl, substituted phenyl, polyaromatic, fused aromatic systems, heteroaromatic, phosphines, and C-4 to C-20 tertiary alkyls. Also, each $R^3$ group is selected from the group consisting of hydrogen, tert-butyl, triorganylsilyl, and phenyl.

To form the polyurethanes, the catalysts are then combined with appropriate solvents, one or more alcohols or polyols, and one or more isocyanates, to form a mixture and the gel time of the mixture is measured. The so-called "gel time" corresponds to the time in hours following activation of the catalyst at which flow is no longer observed in the mixture. The results of the application of novel divalent tin compounds in the catalytic formation of polyurethanes are shown in the Tables in the Examples below. Polyurethanes formed using the catalysts and processes disclosed herein generally have gel times longer than those of polyurethanes formed using other catalysts. Generally, an increase in gel time of 0.8 to 8.0 hours is achieved when the catalysts are use in the process disclosed in the Examples below. The gel time of a polyurethane made using the catalysts and processes disclosed herein depends, in part, upon the concentration of the catalyst. Preferred concentrations of catalyst are from 1800 to 250 ppm (based on the total amount of materials reacted. Thus, a gel time can be controlled by the amount of catalyst used.

Catalytic activity can also be shown by testing of film dry time. As shown in the Examples below, a thin film test was done using a B. K. Dry Time Recorder (Gardco Model BK-3, Pompano, Fla.) to determine how long it takes for the film to completely dry. There are four stages in the drying phase that can be measured with the use of a B. K. strip. The first stage indicates the time it takes for the solvent to evaporate from the sample. The end of the first stage is found where a pear shaped impression is formed in the film. The second phase corresponds to a solution-gel transition. The second stage is identified when the needle cuts a continuous track in the film. The third phase shows the time it takes for the surface to dry. This stage begins when there are small interruptions in the track the needle is forming. Stage four shows the time it takes for the film to completely dry. Stage four is when the needle does not penetrate the film any longer but rides on the top.

The production of polyurethane is usually achieved by addition of polymeric polyols to isocyanates. Polyols are generally defined as polymeric or oligomeric organic species with at least two hydroxy functionalities. A schematic of a polyol generally used in the art is shown below as structure 7, and is referred to as Polyol herein. It is available from DuPont, Wilmington, Del.

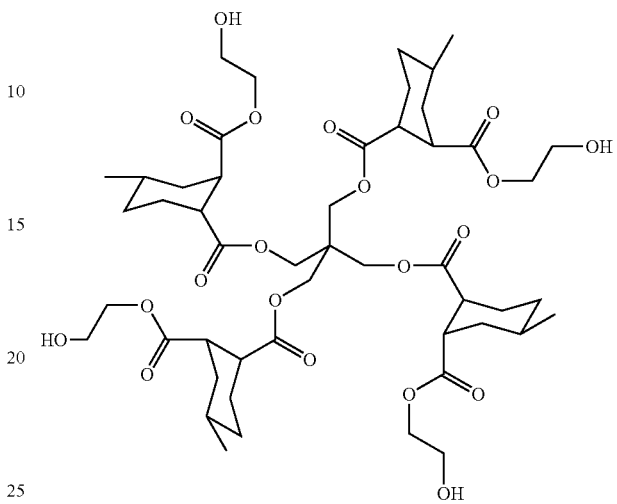

The starting Polyol may be either a low molecular weight oligomer (generally from about 500 to 3000 wt. avg. molecular weight, preferably from about 600 to about 2000 wt. avg. molecular weight) or a polymer with OH functionality (generally from about 2000 to about 300,000 wt. avg. molecular weight, preferably from about 2500 to about 100,000 wt. avg. molecular weight, and more preferably from about 2500 to about 50,000 wt. avg. molecular weight.

The production of a polyurethane may also use other isocyanate-reactive compounds, including but not limited to alcohols, amines, thiols and mixtures of these compounds.

An example of an isocyanate with functional groups capable of reacting with hydroxyl is as follows:

$$(O=C=N)_{n>2} R_5$$

wherein $R_5$ is an alkyl structure such as, for example, ethyl, propyl, phenyl. In some preferred embodiments, $R_5$ is $(CH_2)_6$. The formula directly hereinabove represents a "polyisocyanate" since n>2.

Examples of suitable isocyanates include aromatic, aliphatic or cycloaliphatic di-, tri- or tetra-isocyanates, including polyisocyanates having isocyanurate structural units, such as, the isocyanurate of hexamethylene diisocyanate and isocyanurate of isophorone diisocyanate; the adduct of 2 molecules of a diisocyanate, such as, hexamethylene diisocyanate and a diol such as, ethylene glycol; uretidiones of hexamethylene diisocyanate; uretidiones of isophorone diisocyanate or isophorone diisocyanate; the adduct of trimethylol propane and meta-tetramethylxylene diisocyanate.

Additional examples of suitable polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyldicyclohexylmethane-4,4'-diisocyanate, a toluene diisocyanate, 1,3-bis(1-isocyanato 1-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4'-diisocyanatodiphenyl, 3,3'-dichloro-4,4'-diisocyanatodiphenyl, 3,3'-diphenyl-4,4'-diisocyanatodiphenyl, 3,3'-dimethoxy-4,4'-diisocyanatodiphenyl, 4,4'-diisocyanatodiphenylmethane, 3,3'-dimethyl-4,4'-diisocyanatodiphenyl methane, a diisocyanatonaphthalene, polyisocyanates having isocyanaurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (available under the trademark Desmodur® N from Bayer Corporation of Pittsburgh, Pa.), the adduct of 1 molecule of trimethylol propane and 3 molecules of toluene diisocyanate (available under the trademark Desmodur® L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

A specific example of an isocyanate capable of reacting with hydroxyl groups is Desmodur® 3300 isocyanate, available from Bayer. Desmodur® 3300 as available commercially, comprises a mixture of compounds, with a general structure as follows (also, pentamer, heptamer and higher molecular weight species can be present):

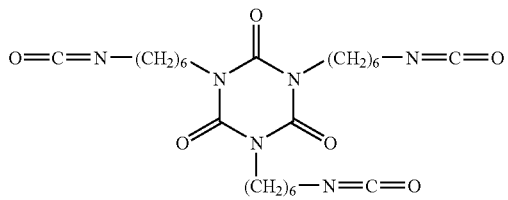

It is preferred that the compositions made before reaction with the catalyst be of relatively low molecular weight (generally less than about 50,000 wt. avg. molecular weight so as to keep the viscosity of the compositions before crosslinking low, and therefore avoid or minimize the need for solvent(s).

Other materials, which may be present in the compositions and processes, include one or more solvents (and are meant to act only as solvents). These preferably do not contain groups such as hydroxyl or primary or secondary amino.

The present compositions, and the process for making them crosslinked, are useful as encapsulants, sealants, and coatings, especially transportation (automotive) and industrial coatings. As transportation coatings, the present compositions are useful as both OEM (original equipment manufacturer) and automotive refinish coatings. They may also be used as primer coatings. They often cure under ambient conditions to tough hard coatings and may be used as one or both of the so-called base coat and clear coat automotive coatings. This makes them particularly useful for repainting of transportation vehicles in the field.

Depending on use, the compositions and the materials used in the present processes may contain other materials. For example, when used as encapsulants and sealants, the compositions may contain fillers, pigments, and/or antioxidants.

Compounds of this invention can be used as catalysts for making coatings and generally in applications where curing of polyurethane is required, for example in the adhesives industry and related applications. The compositions are also suitable for use as clear or pigmented coatings in industrial and maintenance coating applications.

EXAMPLES

Example 1

2,4,6-Tri-tert-butylphenoxide of Sn(II)

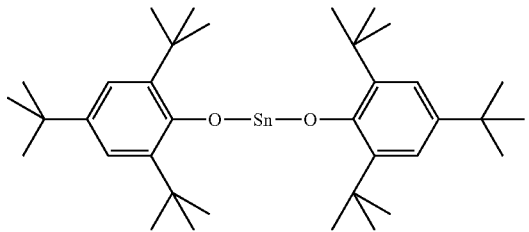

20.14 g (0.0767 mol) of 2,4,6-Tri-tert-butyl-phenol, 16.86 g (0.0384 mol) of bis[bis(trimethylsilyl)amino]tin(II) and 100 ml of toluene were stirred at room temperature under nitrogen for 24 hours. Then, the solvent and bis(trimethylsilyl)amine was removed in 1 mm vacuum. The residue was recrystallized from 50 ml of pentane. Yield of 2,4,6-tri-tert-butylphenoxide of Sn(II) was 17.34 g (70%) as an orange solid, which is unstable on air. $^1$H NMR ($C_6D_6$) 1.30 (s, 18H, t-Bu), 1.52 (s, 36H, t-Bu), 7.43 (s, 4H, arom-H). $^{13}$C NMR ($C_6D_6$) δ32.1, 33.2, 34.7, 35.6, 122.1, 139.1, 140.6, 155.9. $^{119}$Sn NMR ($C_6D_6$)—191.1 ppm. Structure was proven by X-ray analysis.

Example 2

2,6-Di-tert-butyl-4-methoxy-phenoxide of Sn(II)

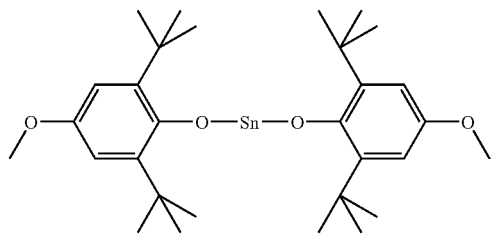

15.0 g (0.0635 mol) of 2,6-Di-tert-butyl-4-methoxy-phenol, 14.64 g (0.0333 mol) of bis[bis(trimethylsilyl)amino]tin (II) and 100 ml of toluene were stirred at room temperature under nitrogen for 24 hours. Then, the solvent and bis(trimethylsilyl)amine was removed in 1 mm vacuum. The residue was recrystallized from 50 ml of pentane. Yield of 2,6-di-tert-butyl-4-methoxy-phenoxide of Sn(II) was 14.3 g (77%) as an orange solid, which is unstable on air. $^1$H NMR ($C_6D_6$) 1.60 (s, 36H, t-Bu), 3.59 (s, 6H, MeO), 7.12 (s, 4H, arom-H). $^{13}$C NMR ($C_6D_6$) 33.0, 35.5, 55.4, 111.4, 140.5, 151.9, 152.8. Structure was proven by X-ray analysis as shown in FIG. 1.

Example 3

Gel Time Testing of Sn(2,4,6-tri-tert-Bu$_3$C$_6$H$_2$O)$_2$

A 2%, by mass, stock solution of catalyst prepared as in Example 1 was prepared by taking 116 mg of catalyst then diluting it with butyl acetate until it reached a total mass of 5.799 g. Two samples were prepared, one at 800 ppm and the other at 1800 ppm. The standard starting reagents for doing a gel time test or a B. K. Dry test was 1.95 g of Desmodur® 3300A and 4.74 g Polyol. For the 800 ppm solution 197 μl of stock solution was added to this mixture, for the 1800 ppm solution 443 μl of stock solution was added using a pipette. Three more samples were also ran later at different concentrations using the same amount of Desmodur® 3300A and Polyol. These samples were at 1200 ppm, 500 ppm, and 250 ppm using 295 μl, 123 μl, 61.6 μl of stock solution respectively. The gel times for these samples are listed in the table below.

TABLE 1

Gel times of polyurethanes with 2,4,6-tri-tert-butylphenoxide of Sn(II): Sn(2,4,6 $^t$Bu$_3$C$_6$H$_2$O)$_2$. Increasing the catalyst loadings resulted in shortening of gel times.

| Concentration (ppm) | Gel Time (hours) |
|---|---|
| 250 | 8.23 |
| 500 | 3.27 |
| 800 | 1.65 |
| 1200 | 1.28 |
| 1800 | .82 |

A B. K. dry time test was performed on the 800 ppm sample. The time scale setting on the machine was adjusted so that it would take 24 hours for the needle to traverse the whole strip. The film was applied to the B. K. strip using a 150 micron drawdown. The machine was turned on and the strip was placed in the machine and the needle was applied to the strip. The starting point of the needle on the strip was marked so that the times of the different stages could be measured and calculated. The distance on the strip between the starting point and the end of the previous stage are measured in centimeters, i.e. the distance from the start point to the end of stage three is used to calculate how long it took to reach stage four. Then the distance was multiplied by the constant for the 24 hour setting, 47.24 minutes. Stage three was reached after 8.7 hours, while stage four was reached after 12.4.

Example 4

Gel Time Testing of Sn(2,6 tBu$_2$ 4-methoxy C$_6$H$_2$O)$_2$

A 5%, by mass, stock solution of the catalyst prepared as in Example 2 was prepared by taking 101 mg of catalyst then diluting it with tetrahydrofuran until it reached a total mass of 2.001 g. Four samples were prepared at 1200 ppm, 800 ppm, 500 ppm, and 300 ppm. The standard starting reagents for doing a gel time test on a B. K. Dry test is 1.95 g of Desmodur® 3300A and 4.74 g Polyol were used. All stock solution aliquots were added using a pipette. The 1200 ppm solution was prepared by adding 118.4 μl to the Desmodur® and Polyol mixture. For the 800 ppm solution 78.9 μl of stock solution were added to this mixture. The 500 ppm solution was prepared with 49.3 μl of stock solution. The 300 ppm sample was prepared by adding 24.6 μl to the mixture. The gel times for these samples are listed on the table below.

TABLE 2

Gel times of polyurethanes with 2,6-di-tert-butyl-4-methoxy-phenoxide of Sn(II): Sn(2,6-tert-Bu$_2$-4-methoxy C$_6$H$_2$O)$_2$. Increasing the catalyst loadings resulted in shortening of gel times.

| Concentration (ppm) | Gel Time (hrs) |
|---|---|
| 1200 | 1.62 |
| 800 | 2.17 |
| 500 | 3.67 |
| 300 | 5-7 |

What is claimed is:

1. A process, comprising:
   a) providing a bivalent, monomeric tin compound of the formula:

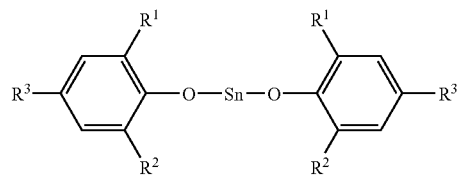

wherein
   each R$^1$ and R$^2$ are each a sterically hindering group independently selected from the group consisting of heteroaryl, phenyl, substituted phenyl, polyaromatic, fused aromatic systems, heteroaromatic, phosphines, tert-butyldimethylsilyl, di-tert-butyl-phosphino, di-tert-butyl-thiophosphino, di-tert-butyl-phosphoryl, di-tert-butyl-iminophosphino, tert-butyl-amino, tert-butyl-thio, tert-butyl-seleno, tert-butoxy, and di-tert-butyl-boronyl;
   each R$^3$ is independently a group that enables solubility of the compound; and
   b) combining said compound with one or more isocyanate-reactive groups and one or more compounds comprising an isocyanate group to form a polyurethane.

2. The process of claim 1, wherein said polyurethane has a gel time from 0.8 to 8.5 hours, when said catalyst concentration is varied from 1800 ppm to 250 ppm.

3. The process of claim 1, wherein said sterically hindering group is selected from the group consisting of triethylmethyl, triphenylmethyl (Trityl), 1-methylcyclohexyl, 1-methylcyclopentyl, neopentyl, trimethylsilyl, triphenylsilyl, tris(trimethylsilyl)silyl, trifluoromethyl, adamantyl, methyladamantyl, di-mesityl-phosphino, di-mesityl--thiophosphino, di-mesityl-phosphoryl, di-mesityl-iminophosphino, 2,4,6-tri-iso-propylphenyl, 2,4,6-tri-ethylphenyl, 2,4,6-tri-tert-butylphenyl, 2,4,6-tri-phenylphenyl, pyrenyl, anthracenyl, acridinyl, and xanthenyl.

4. The process of claim 1, wherein each R$^3$ group is independently selected from the group consisting of hydrogen, triorganylsilyl, and phenyl.

5. The process of claim 1, wherein each R$^3$ is methoxy.

6. A substrate coated with a composition comprising the polyurethane produced by the process of claim 1.

* * * * *